(12) United States Patent
Enomoto et al.

(10) Patent No.: US 6,487,340 B2
(45) Date of Patent: Nov. 26, 2002

(54) OPTICAL FIBER GRATING ELEMENT, PRODUCTION METHOD, AND OPTICAL FIBER FILTER

(75) Inventors: Tadashi Enomoto, Yokohama (JP); Shinji Ishikawa, Yokohama (JP); Masakazu Shigehara, Yokohama (JP); Michiko Takushima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/903,763

(22) Filed: Jul. 13, 2001

(65) Prior Publication Data

US 2002/0003926 A1 Jan. 10, 2002

Related U.S. Application Data

(63) Continuation-in-part of application No. PCT/JP00/00135, filed on Jan. 13, 2000.

(30) Foreign Application Priority Data

Jan. 13, 1999 (JP) ............................................. 11-006704

(51) Int. Cl.⁷ .................................................. G02B 6/34
(52) U.S. Cl. ............................. 385/37; 385/28; 385/29; 385/126
(58) Field of Search ............................... 385/28, 29, 37, 385/24, 123, 126, 130

(56) References Cited

U.S. PATENT DOCUMENTS

| | | | |
|---|---|---|---|
| 5,703,978 A | | 12/1997 | DiGiovanni et al. .......... 385/37 |
| 5,883,990 A | * | 3/1999 | Sasaoka et al. ............... 385/37 |
| 6,366,722 B1 | * | 4/2002 | Murphy et al. ................ 385/37 |
| 6,408,118 B1 | * | 6/2002 | Ahuja et al. ................... 385/37 |

FOREIGN PATENT DOCUMENTS

| | | |
|---|---|---|
| EP | 668514 | 8/1995 |
| EP | 909965 | 5/1999 |
| JP | 9-113729 | 5/1997 |
| JP | 9-145941 | 6/1997 |
| JP | 9-274115 | 10/1997 |
| WO | WO 97/26571 | 7/1997 |

OTHER PUBLICATIONS

Turan Edrogan, "Cladding–mode resonances in short–and long–period fiber grating filters", J. Opt. Soc. Am. A, vol. 14, No. 8, Aug. 1997, pp. 1760–1773.

(List continued on next page.)

*Primary Examiner*—Akm E. Ullah
*Assistant Examiner*—Jennifer Doan
(74) *Attorney, Agent, or Firm*—McDermott, Will & Emery

(57) ABSTRACT

The present invention relates to an optical fiber grating element having structure enabling more precise design and fabrication, a production method thereof, and an optical fiber filter including the same. The optical fiber grating element according to the present invention comprises a multi-mode optical fiber having a first core region of a refractive index n1, a second core of a refractive index n2 provided on a periphery of the first core region, and a cladding region of a refractive index n3 provided on a periphery of the second core region, and having a cutoff wavelength regarding to LP02-mode light on the longer wavelength side than a wavelength band in use. A long-period grating for selectively coupling the fundamental LP01-mode light of a predetermined wavelength in the wavelength band I use to LP0m (m≧2)-mode light is provided in a predetermined region of the first core region.

11 Claims, 8 Drawing Sheets

OTHER PUBLICATIONS

B.H. Lee, "*Displacements of the resonant peaks of a long–period fiber grating induced by a change of ambient refractive index*", Optics Letters, vol. 22, No. 23, Dec. 1, 1997, pp. 1769–1771.

B.H. Lee, "*Cladding–surrounding interface insensitive long–period grating*", Electronics Letters, vol. 34, No. 11, May 28, 1998, pp. 1129–1130.

Ashish M. Vengsarkar et al., "*Long–Period Fiber Gratings as Band–Rejection Filters*", Journal of Lightwave Technology, vol. 14, No. 1, Jan. 1996, pp. 58–64.

R.P. Espindola, "*Highly Reflective Fiber Bragg Gratings Written Through a Vinyl Ether Fiber Coating*", IEEE Photonics Technology Letters, vol. 11, No. 7, Jul. 1999, pp. 833–835.

L. Chao, "*Grating writing through fibre coating at 244 and 248 nm*", Electronics Letters, vol. 35, No. 11, May 27, 1999, pp. 924–926.

Nyuyen Hong Ky, "*Efficient broadband intracore grating $LP_{01}$–$LP_{02}$ mode converters for chromatic–dispersion compensation*", Optics Letters, vol. 23, No. 6, Mar. 15, 1998, pp. 445–447.

Byeong Ha Lee et al., "*Long–period grating written in DSC dispersion shifted fiber*", Third Optoelectronics and Communications Conference Technical Digest, Jul. 1998, pp. 286–287.

M. Shigehara et al., "*Highly Reliable Long–Period Fiber Grating Written Through Fiber Coating*", 1999 IEICE's Electronics Society Conference, pp. 1–3.

International Search Report prepared by the Japanese Patent Office.

* cited by examiner

|  | SAMPLE 4 | SAMPLE 5 | SAMPLE 6 | SAMPLE 7 |
|---|---|---|---|---|
| MOLAR RATIO OF $GeO_2$ AND $B_2O_3$ | 3.5:1 | 3.5:1 | 3:1 | 1:2 |
| GRATING PERIOD $\Lambda$ ($\mu$m) | 410 | 370 | 370 | 370 |
| CUTOFF CENTER WEVELENGTH (nm) | 1528 | 1540 | 1537 | 1541 |
| TEMPERATURE DEPENDENCE AT CENTER WEVELENGTH $\lambda \frac{d\lambda}{dT}$ (nm/°C) | +0.021 | +0.010 | +0.002 | -0.132 |

OPTICAL FIBER GRATING ELEMENT, PRODUCTION METHOD, AND OPTICAL FIBER FILTER

RELATED APPLICATIONS

This is a Continuation-In-Part application of International Patent application Ser.No. PCT/JP00/00135 filed on Jan. 13, 2000, now pending.

BACKGROUND OF THE INVENTION

1. Field of the Invention

The present invention relates to optical components applicable to optical communication systems and, more particularly, to an optical fiber grating element provided with a long-period grating in a multi-mode optical fiber, a production method thereof, and an optical fiber filter including the same.

2. Related Background Art

An optical fiber grating element provided with a long-period grating (LPG: Long-Period Grating) in a core is an optical component that couples core-mode light of a predetermined wavelength to cladding-mode light by the long-period grating to attenuate the light of the predetermined wavelength. In other words, the optical fiber grating element is the optical component that selectively transfers the power of the core-mode light of the predetermined wavelength to the cladding-mode light (for example, see A. M. Vengsarkar, et al., J. of Lightwave Tech., Vol. 14 (1996) pp58–64). Here the core-mode light is light propagating as being confined in the core region of the optical fiber. On the other hand, the cladding-mode light is light radiating from the core into the cladding of optical fiber. Such optical fiber grating elements are utilized as optical fiber filters or the like for selectively cutting off the core-mode light of the predetermined wavelength (loss wavelength) out of the core-mode light of a wavelength band in use having propagated in the optical fiber, in the fields of optical communications and the like.

Cladding modes mean high-order modes except for the fundamental mode when consideration is given to the entire region of the optical fiber specified by the cladding surface being the outermost layer or by the interface between the cladding and a coating layer covering the cladding. For example, in single-mode optical fibers, there exist the fundamental mode with consideration to propagation only in the core and the high-order modes with consideration to propagation in the entire region A of the optical fiber, as illustrated in FIG. 1A. In the case of the single-mode optical fibers, therefore, change in the refractive indices of the surroundings around the cladding (the refractive indices of the air layer and the coating layer) will also cause a shift of the wavelength at which the coupling occurs from the core-mode light to the cladding-mode light, i.e., a shift of the loss wavelength in the long-period grating. There will also occur variations in attenuation factor of the core-mode light of the loss wavelength. Particularly, it is known that when the peripheral surface of the multi-mode optical fiber is covered with a resin having the refractive index close to glass, the high-order modes (cladding modes) disappear as illustrated in FIG. 1B (for example, see B. H. Lee, et al., OECC'98, 14P-50 and B. H. Lee, et al., Electronics Letters, Vol. 34 (1998) pp1129–1130). For that reason, it was infeasible to cover the optical fiber grating element provided with the long-period grating in the multi-mode optical fiber, with a coating for the purpose of protection for the element.

In order to overcome this problem, the optical fiber grating element described in above B. H. Lee et al. comprises the long-period grating in the single-mode optical fiber having the index profile of dual shape core (DSC) structure the base of which is silica. Here the single-mode optical fiber of DSC structure is composed of a first core region of a refractive index n1, a second core region of a refractive index n2, and a cladding region of a refractive index n3 in the order named from the center of the optical axis (where n1>n2>n3). The first and second core regions of the single-mode optical fiber both are doped with $GeO_2$ and these first and second core regions are exposed to ultraviolet light spatially intensity-modulated, thereby obtaining the optical fiber grating element in which an index-modulated area or a grating is formed across these two regions. The optical fiber grating element, which is obtained by providing the long-period grating in the single-mode optical fiber as described, couples the core-mode light of the predetermined wavelength propagating in the first core region to the high-order mode (cladding-mode) light, so as to cut off the core-mode light of the predetermined wavelength.

This long-period grating is a grating that induces coupling (mode coupling) between the core mode propagating in the optical fiber and the cladding mode, as elucidated in U.S. Pat. No. 5,703,978, and that is definitely discriminated from the short-period gratings that reflect the light centered about the predetermined wavelength. In the long-period grating, in order to achieve strong power conversion from the core mode to the cladding mode, the grating period (pitch) Λ is set so that the difference between propagation constants of the core-mode light of the predetermined wavelength (loss wavelength) and the cladding-mode light becomes $2\pi/\Lambda$. Since the long-period grating acts to couple the core mode to the cladding mode in this way, the core-mode light attenuates in a narrow band centered around the predetermined wavelength (loss wavelength).

SUMMARY OF THE INVENTION

Inventors studied the above conventional techniques and found the following issues. First, it is extremely difficult to design and fabricate the optical fiber grating element with desired cutoff characteristics (loss wavelength and loss amount) by the technology described in the above documents of B. H. Lee et al. The reason is that changes of index in each of the first and second core regions based on the exposure to ultraviolet light are greatly affected by the conditions of the intensity of the radiant ultraviolet light, the exposure time, and so on, or by the conditions of a pretreatment of the optical fiber to be exposed to the ultraviolet light.

In addition, since it is difficult to predict the changes of index in each of the first and second core regions, it is extremely difficult to accurately control the fabrication of the optical fiber grating element so that both the loss wavelength (cutoff wavelength) and loss amount (cutoff amount) fall at designed values or within a designed range.

The present invention has been accomplished in order to solve the problems described above and an object of the invention is to provide an optical fiber grating element of structure permitting more precise design and fabrication, a production method thereof, and an optical fiber filter including the same.

An optical fiber grating element according to the present invention comprises a multi-mode optical fiber having a cutoff wavelength regarding to LP02-mode light on the longer wavelength side than a wavelength band in use, and a long-period grating provided in the multi-mode optical fiber, for selectively coupling fundamental LP01-mode light of a predetermined wavelength within the wavelength band in use to LP0m (m≧2)-mode light. Specifically, the multi-mode optical fiber comprises a first core region of a refractive index n1 extending along a predetermined axis, a second core region of a refractive index n2 (<n1) disposed on a periphery of the first core region, and a cladding region of a refractive index n3 (<n2) disposed on a periphery of the second core region, and the long-period grating is provided in the first core region surrounded by the second core region. Such a multi-mode optical fiber may take such structure that an intermediate core region is provided between the first and second core regions or such structure that a depressed region is further provided between the second core region and the cladding region. In either of the structures, the multi-mode optical fiber applied to the optical fiber grating element has such structure that the cladding region is provided so that a propagation region A of a high-order mode is spaced away from the interface between the peripheral surface of the fiber and a coating material, as illustrated in FIG. 2.

Particularly, the optical fiber grating element according to the present invention is characterized by satisfying the relation of n1>Neff01>n2>Neff0m>n3, where the effective refractive index with respect to the fundamental LP01-mode light is Neff01 and the effective refractive index with respect to the LP0m (m≧2)-mode light Neff0m. With the optical fiber grating element of this structure, the fundamental LP01-mode light of the predetermined wavelength within the wavelength band in use is coupled to the higher LP0m (m≧2)-mode light by the long-period grating formed in the first core region of the multi-mode optical fiber. Since the higher LP0m (m≧2)-mode light is confined in the propagation region specified by the first and second core regions of the multi-mode optical fiber, it is little affected by the layer existing outside the multi-mode optical fiber (see FIG. 2). On the other hand, the fundamental LP01-mode light of the wavelengths other than the predetermined wavelength passes through the long-period grating provided in the first core region as it is. The fundamental LP01-mode light is confined in the first core region, whereas the higher LP0m (m≧2)-mode light is confined in the propagation region specified by both the first and second core regions. Thus the mode field diameter of the multi-mode optical fiber is large for the higher LP0m (m≧2)-mode light. In the case wherein a single-mode optical fiber is connected as a post stage of the optical fiber grating element, coupling loss is small when the fundamental LP01-mode light having passed through the long-period grating of the multi-mode optical fiber is incident to the core of the single-mode optical fiber. On the other hand, coupling loss is large when the higher LP0m (m≧2)-mode light generated in the long-period grating of the multi-mode optical fiber is incident to the core region of the single-mode optical fiber.

With the multi-mode optical fiber of the above-stated structure, it is preferable to dope only the first core region with $GeO_2$. The reason is that the coupling efficiency is increased in coupling from the fundamental LP01-mode light to the higher LP0m (m≧2)-mode light. Since the second core region is not doped with $GeO_2$, there is no change in the refractive index of the second core region before and after formation of the grating. For this reason, change is small in the mode field diameter of the multi-mode optical fiber with the long-period grating for the higher LP0m (m≧2)-mode light, so that the optical fiber grating element can realize desired coupling characteristics and cutoff characteristics readily.

In the optical fiber grating element according to the present invention, the above multi-mode optical fiber may be coated at least around the peripheral surface surrounding the portion in which the long-period grating is formed. The reason is that since the higher LP0m (m≧2)-mode light generated in the long-period grating is confined in the first and second core regions, variations are small in the wavelength at which there occurs the coupling from the fundamental LP01-mode light to the higher LP0m (m≧2)-mode light, and in the coupling efficiency even if the grating-forming portion is coated. The coating is also effective in protecting the optical fiber grating element.

Particularly, if the layer covering the peripheral surface of the multi-mode optical fiber is an ultraviolet-transmissive resin, it eliminates the need for once stripping the coating layer as before. Thus the multi-mode optical fiber is prevented from externally being damaged, and the optical fiber grating element can be fabricated within short time.

Accordingly, a production method of the optical fiber grating according to the present invention is characterized by preparing a multi-mode optical fiber comprising at least a first core region of a refractive index n1 doped with a predetermined amount of $GeO_2$, a second core region of a refractive index n2 (<n1), and a cladding region of a refractive index n3 (<n2) and covered with an ultraviolet-transmissive resin over the peripheral surface of the cladding region, as described above, and exposing this ultraviolet-transmissive resin to ultraviolet light, thereby forming periodic change of refractive index within the first core region. In this case, most of the ultraviolet rays impinging on the ultraviolet-transmissive resin pass the ultraviolet-transmissive resin, the cladding region, and the second core region in the stated order to reach the first core region.

The above wavelength band in use is preferably 1.2 $\mu$m or more but 1.7 $\mu$m or less. The wavelength band of this range enables use of the optical fiber grating element in the wavelength bands commonly used in optical communications. The multi-mode optical fiber is preferably one having normalized frequency of 4 or more but 12 or less at the above wavelength band in use. It is because this configuration enables the effective coupling from the fundamental LP01-mode light of the predetermined wavelength to the higher LP0m (m≧2)-mode light and because it enables more precise design and fabrication of the optical fiber grating element with desired characteristics.

It is known that the long-period grating shifts its center wavelength of the loss band (loss peak wavelength) depending upon ambient temperature around the optical fiber grating element. In order to reduce such temperature dependence of loss peak wavelength, the optical fiber grating element according to the present invention is preferably one designed so that there exists at least one m satisfying the following relation:

$$\frac{0.01 \, (\mu m/°C.)}{\Lambda(\mu m)} \geq \left| \frac{d}{dT}(Neff01) - \frac{d}{dT}(Neff0m) \right|,$$

where dNeff01/dT is a temperature dependence of the effective refractive index Neff01 with respect to the above fundamental LP01-mode light, dNeff0m/dT (m≧2) a temperature dependence of the effective refractive index Neff0m with respect to the above LP0m (m≧2)-mode light, and $\Lambda$ a grating period of the above long-period grating. The above condition can be met, for example, by doping the first core region with at least either element of Ge, P, and B and properly adjusting a doping amount thereof.

It also becomes feasible to effect variable control of the loss peak wavelength (which will also be referred to hereinafter as temperature active control) by positively making use of such temperature dependence of the loss peak wavelength to the contrary. In this case, the optical fiber grating element according to the present invention is preferably one designed so that there exists at least one m satisfying the following relation:

$$\frac{0.08\,(\mu m/^\circ C.)}{\Lambda(\mu m)} \geq \left|\frac{d}{dT}(Neff01) - \frac{d}{dT}(Neff0m)\right|,$$

where dNeff01/dT is a temperature dependence of the effective refractive index Neff01 with respect to the above fundamental LP01-mode light, dNeff0m/dT (m≧2) a temperature dependence of the effective refractive index Neff0m with respect to the above LP0m (m≧2)-mode light, and Λ a grating period of the above grating. The above condition can also be met, for example, by doping the first core region with at least either element of Ge, P, and B and properly adjusting a doping amount thereof.

An optical fiber filter according to the present invention comprises an optical fiber grating element having the structure described above, and a single-mode optical fiber having a cutoff wavelength regarding to LP02-mode light on the shorter wavelength side than the above wavelength band in use. This single-mode optical fiber is placed at least in a post stage of the optical fiber grating element when seen from a traveling direction of signal light of wavelengths included within the above wavelength band in use. In this optical fiber filter, the fundamental LP01-mode light of the predetermined wavelength within the wavelength band in use is coupled to the higher LP0m (m≧2)-mode light by the long-period grating provided in the first core region of the optical fiber grating element. Since the higher LP0m (m≧2)-mode light is confined in the propagation region specified by the first and second core regions of the multi-mode optical fiber, it is little affected by the external environment of the multi-mode optical fiber. In this optical fiber filter, the core-mode light of the predetermined wavelength is also coupled to the higher LP0m (m≧2)-mode light, but the coupling loss is large when this higher LP0m (m≧2)-mode light is incident to the core region of the single-mode optical fiber optically connected in the post stage. On the other hand, the fundamental LP01-mode light of the wavelengths other than the predetermined wavelength passes through the long-period grating of the optical fiber filter, but the coupling loss is small when this core-mode light is incident to the core region of the single-mode optical fiber optically connected in the post stage. Namely, the optical fiber filter functions to cut off (or selectively attenuate) the fundamental LP01-mode light of the predetermined wavelength within the wavelength band in use but transmit the fundamental LP01-mode light of the other wavelengths.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 9A is a graph to show the cutoff characteristics of the optical fiber grating element upon fabrication, FIG. 9B those after annealing, and FIG. 9C those after recoating.

FIG. 10A is a graph to show the cutoff characteristics of the optical fiber grating element upon fabrication, FIG. 10B those after annealing, and FIG. 10 those after recoating.

DESCRIPTION OF THE PREFERRED EMBODIMENTS

Each of embodiments of the optical fiber grating and optical filter and the like according to the present invention will be described hereinafter referring to FIG. 3, FIG. 4A, FIG. 4B, FIGS. 5 to 8, FIG. 9A to FIG. 10C, FIG. 11, and FIG. 12. It is noted that in the description of the drawings the same elements will be denoted by the same reference symbols and redundant description will be omitted.

First Embodiment

Figure 3:
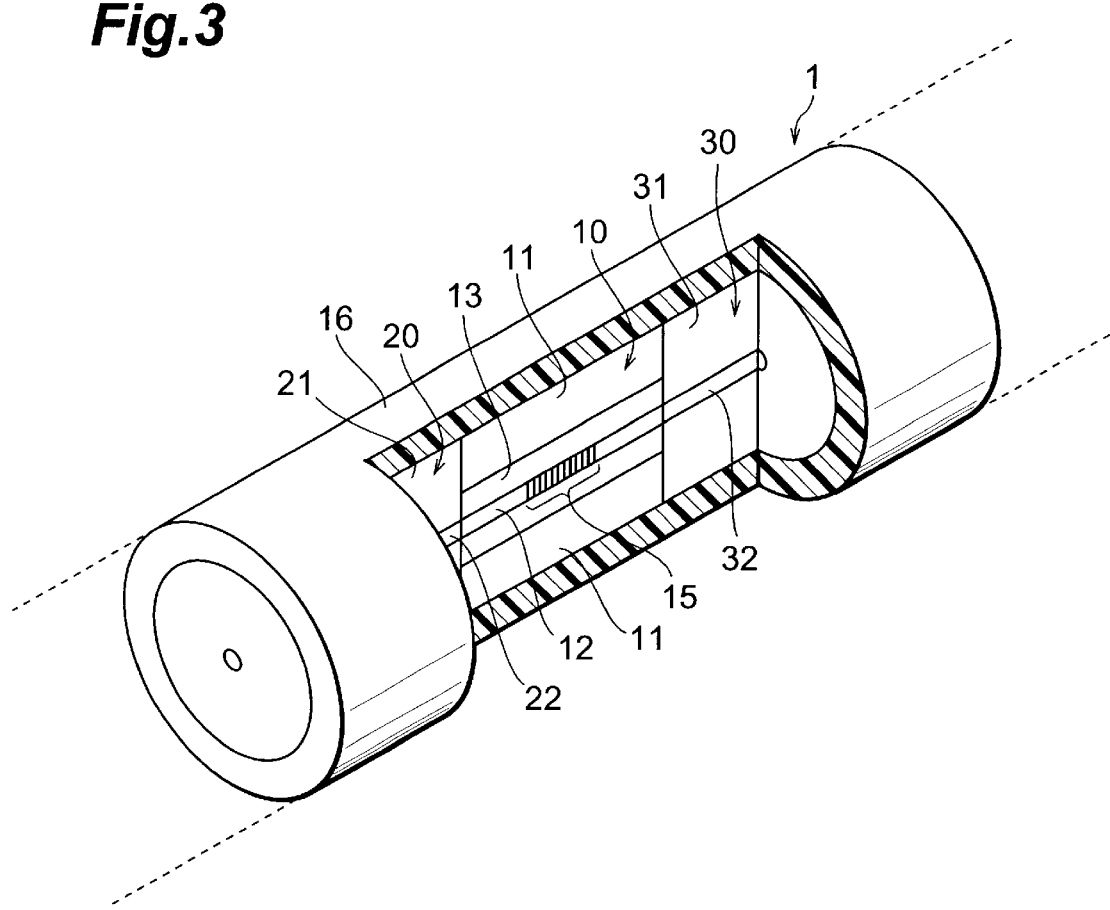
FIG. 3 is a view partly broken to show the structure of the first embodiment of the optical fiber grating and optical fiber filter according to the present invention.

FIG. 3 is a view partly broken to show the structure of the optical fiber grating element and optical fiber filter according to the first embodiment. In the optical fiber filter 1 according to the first embodiment, a single-mode optical fiber 20, an optical fiber grating element 10, and a single-mode optical fiber 30 are cascaded in the order stated and these elements 10, 20, 30 are integrally covered with a coating layer 16.

The optical fiber grating element 10 consists of a multi-mode optical fiber having the cutoff wavelength regarding to the LP02-mode light on the longer wavelength side than the wavelength band in use and a long-period grating 15 for selectively coupling the fundamental LP01-mode light of the predetermined wavelength within the above wavelength band in use to the LP0m (m≧2)-mode light of a high-order mode. The multi-mode optical fiber consists of a first core region 12 extending along a predetermined axis, a second core region 13 disposed on a periphery of the first core region 12, and a cladding region 11 disposed on a periphery of the second core region 13, and the long-period grating 15 is formed in the first core region 12 surrounded by the second core region 13. The single-mode optical fiber 20 consists of a core 22 extending along the predetermined axis, and a cladding 21 disposed on a periphery of the core 22 and having a lower refractive index than the core 22, while the single-mode optical fiber 30 also consists of a core 32 extending along the predetermined axis and a cladding disposed on a periphery of the core 32 and having a lower refractive index than the core 32.

In this embodiment, the multi-mode optical fiber provided with the long-period grating 15, and the single-mode optical fibers 20, 30 have their respective mode field diameters approximately equal to each other for the fundamental LP01-mode light. This design permits the fundamental LP01-mode light to pass the connections between the optical fibers with low loss.

Figure 4A:
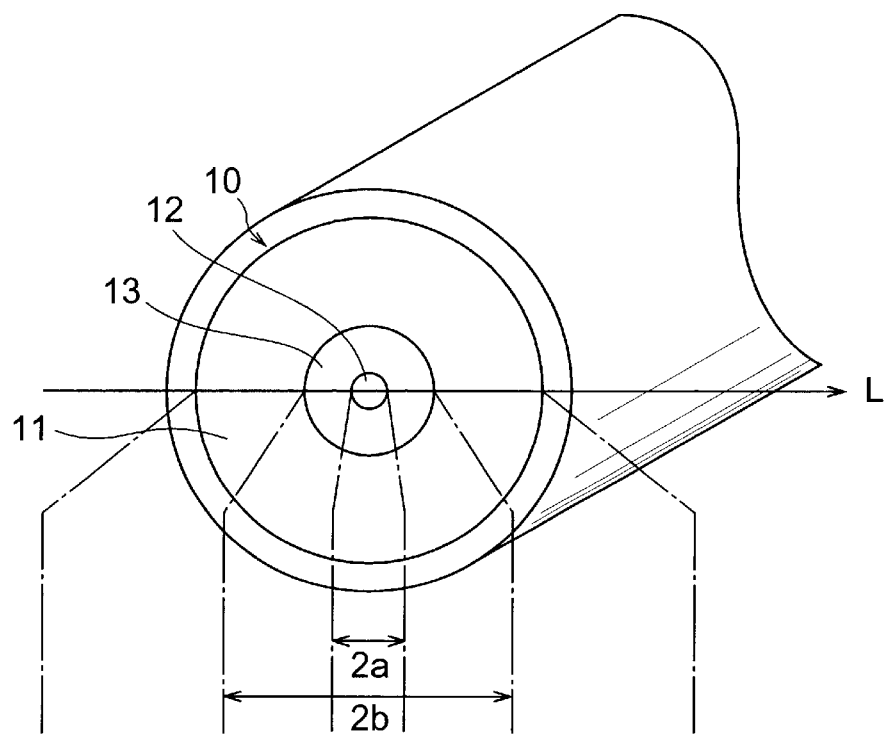
FIG. 4A is a cross-sectional view to show the basic structure of the optical fiber grating element according to the first embodiment.

The optical fiber grating element 10 is provided, for example, with the multi-mode optical fiber consisting of the first core region 12 of the refractive index n1 extending along the predetermined axis and having the outside diameter 2a, the second core region 13 of the refractive index n2 (<n1) disposed on the periphery of the first core region 12 and having the outside diameter 2b, and the cladding region 11 of the refractive index n3 (<n2) disposed on the periphery of the second core region 13, as illustrated in FIG. 4A, and with the coating layer 16 covering the peripheral surface of the multi-mode optical fiber (the peripheral surface of the cladding region 11). The first core region 12 is doped with $GeO_2$ and the first core region 12 is exposed to spatially modulated ultraviolet light whereby the long-period grating 15 is formed in this first core region 12.

Figure 4B:
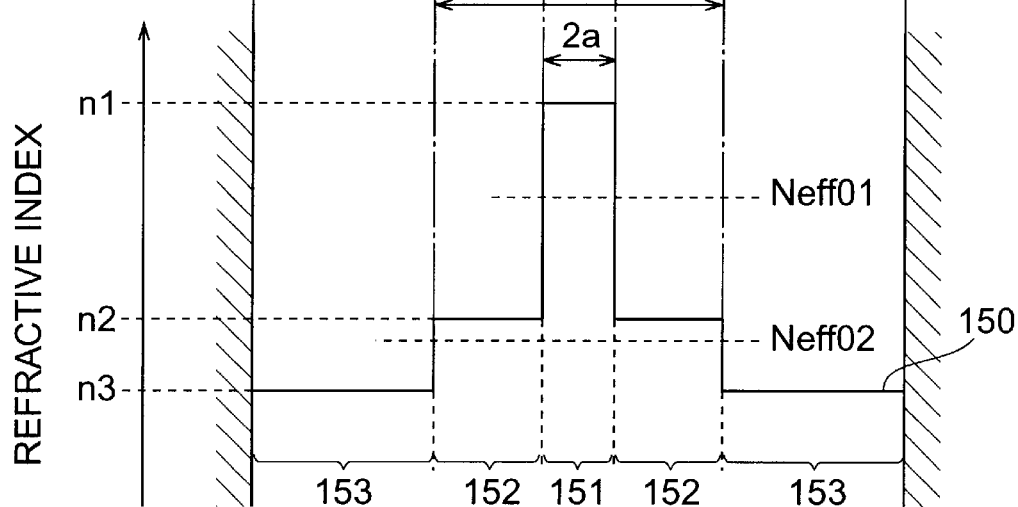
FIG. 4B shows an index profile of the optical fiber grating illustrated in FIG. 4A.

FIG. 4B shows an index profile 150 along a line L of the multi-mode optical fiber in the optical fiber grating element 10 illustrated in FIG. 4A. In this index profile 150, a region 151 indicates the refractive index of each part on the line L of the first core region 12, a region 152 the refractive index of each part on the line L of the second core region 13, and a region 153 the refractive index of each part on the line L of the cladding region 11, respectively.

Figure 2:
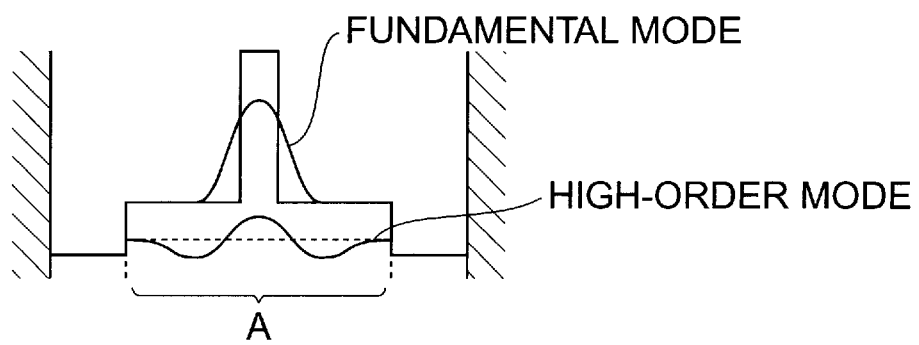
FIG. 2 is a conceptual diagram for briefly explaining the structural feature of the optical fiber grating element according to the present invention.

In the optical fiber grating element 10 having the structure as described above, the fundamental LP01-mode light and the higher LP0m (m≧2)-mode light within the wavelength band in use each propagates in a confined state in the propagation region specified by the first and second core regions 12, 13 (see FIG. 2). Among the light of the wavelength band in use having propagated through the core 22 of the single-mode optical fiber 20, the fundamental LP01-mode light of the wavelength satisfying the phase matching condition between the fundamental LP01-mode and the LP0m (m≧2) mode is coupled by the long-period grating 15 formed in the first core region 12 (mode coupling). Since the mode field diameter of the multi-mode optical fiber is large for the higher LP0m (m≧2)-mode light of the wavelength satisfying this phase matching condition, i.e., the loss wavelength, the higher LP0m (m≧2)-mode light largely attenuates when entering the core 32 of the single-mode optical fiber 30. In other words, the coupling loss between the multi-mode optical fiber provided with the long-period grating 15, and the single-mode optical fiber 30 is large for the higher LP0m (m≧2)-mode light. On the other hand, the coupling loss is small upon incidence to the core 32 of the single-mode optical fiber 30, for the fundamental LP01-mode light of the wavelengths other than the loss wavelength (the core-mode light having passed through the long-period grating 15). Therefore, the optical fiber filter 1 according to the present embodiment functions to cut off the fundamental LP01-mode light of the loss wavelength specified by the grating period Λ of the long-period grating 15 out of the light of the wavelength band in use having propagated through the core region 22 of the single-mode optical fiber 20 but to guide the fundamental LP01-mode light of the wavelengths other than the loss wavelength to the core 32 of the single-mode optical fiber 30 with low loss.

As the mode field diameter of the multi-mode optical fiber increases for the higher LP0m (m≧2)-mode light of the loss wavelength, the loss amount or cutoff amount increases upon incidence of the higher LP0m-mode light into the single-mode optical fiber 30, which is preferable. In the optical fiber grating element 10 according to the first embodiment, therefore, the multi-mode optical fiber is one having the index profile of the dual shape core (DSC) structure consisting of the first core region 12, the second core region 13, and the cladding region 14, as illustrated in FIG. 4A and FIG. 4B, and satisfying the following relation:

$$n1 > Neff01 > n2 > Neff0m > n3 \tag{1}$$

where Neff01 is the effective refractive index with respect to the fundamental LP01-mode light and Neff0m the effective refractive index with respect to the high-order LP0m (m≧2)-mode light (see FIG. 4B).

For the coupling through the long-period grating 15 between the fundamental LP01-mode light and the higher LP0m (m≧2)-mode light, it is necessary to satisfy the phase matching condition specified by the following equation:

$$\lambda = \Lambda(Neff01 - Neff0m) \tag{2}$$

where λ is the wavelength and Λ the period of the long-period grating 15.

Figure 5:
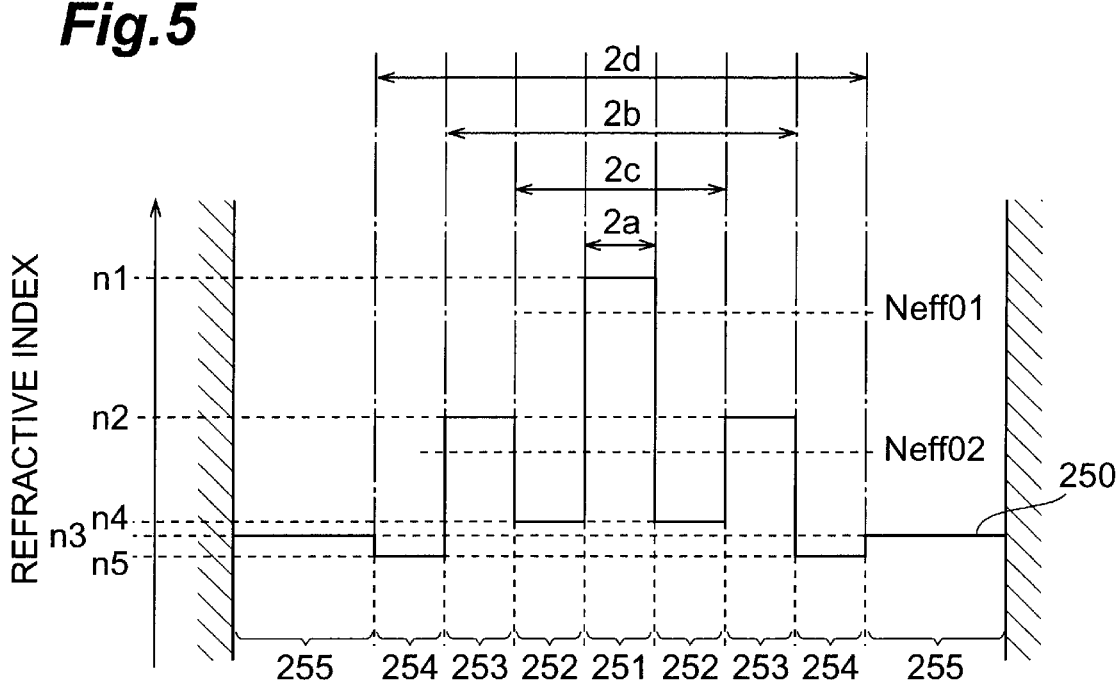
FIG. 5 shows an index profile for explaining another structure of the optical fiber grating element according to the first embodiment.

The multi-mode optical fiber with the long-period grating 15 formed therein may have the index profile 250 as illustrated in FIG. 5, for example. This multi-mode optical fiber has such structure that the multi-mode optical fiber illustrated in FIG. 4A is additionally provided with an intermediate core region of the outside diameter 2c and the refractive index n4 (<n1, n2) between the first core region 12 and the second core region 13 and a depressed region of the outside diameter 2d and the refractive index n5 (<n2, n3) between the second core region 13 and the cladding region 14. In the multi-mode optical fiber having the index profile 250 as illustrated in this FIG. 5, the region for the higher LP0m (m≧2)-mode light to propagate is spaced apart from the coating layer covering the peripheral surface of the multi-mode optical fiber by the cladding region of the outermost layer, thereby enabling the coupling between the fundamental LP01-mode light and the higher LP0m-mode.

In the index profile 250 illustrated in FIG. 5, a region 251 indicates the refractive index of the region corresponding to the first core region 12 in FIG. 4A, a region 252 the refractive index of the intermediate core region, a region 253 the refractive index of the region corresponding to the second core region 13 in FIG. 4A, a region 254 the refractive index of the above depressed region, and a region 255 the refractive index of the region corresponding to the cladding region 14 in FIG. 4A, respectively.

In the multi-mode optical fibers having the index profiles 150, 250 illustrated in these FIG. 4B and FIG. 5, the fundamental LP01-mode light also propagates in a substantially confined state in the first core region 12 (the outside diameter 2a) of the multi-mode optical fiber to enter the core 32 of the single-mode optical fiber 30 of the post stage with high efficiency. The higher LP0m-mode light propagates in a substantially confined state in the propagation region (the outside diameter 2b) specified by both the first and second core regions 12, 13 of the multi-mode optical fiber to attenuate largely upon incidence to the core 32 of the single-mode optical fiber 30 of the post stage. Since the mode field diameter of the multi-mode optical fiber for the higher LP0m-mode light is approximately equal to the outside diameter 2b of the second core region 13, the loss amount (cutoff amount) at the loss wavelength increases with increase in the value of the outside diameter 2b of the second core region 13.

In the multi-mode optical fibers having the index profiles illustrated in FIG. 4B and FIG. 5, it is preferable to dope only the first core region 12 with $GeO_2$. It is because the refractive index n1 of the first core region 12 can be set relatively large as compared with the other regions and the long-period grating 15 can be formed readily by periodically bringing about reaction of crystal defect in the first core region 12 by exposure to ultraviolet light. Since the increase in the refractive index n1 of the first core region 12 also increases the coupling efficiency from the fundamental LP01-mode light to the higher LP0m ($m \geq 2$)-mode light, it is thus also preferable in this respect. Further, since the second core region 13 is not doped with $GeO_2$, there occurs no index change in the second core region 13 before and after formation of the long-period grating 15 in the first core region 12, whereby the mode field diameter of the multi-mode optical fiber can be controlled to small change for the higher LP0m ($m \geq 2$)-mode light and desired coupling characteristics and cutoff characteristics are obtained for each of the optical fiber grating element 10 and the optical fiber filter 1.

The multi-mode optical fiber provided with the long-period grating 15 can be constructed either in a configuration in which the second core region 13 is $P_2O_5$-doped silica and the cladding region 14 pure silica, in a configuration in which the second core region 13 is $P_2O_5$-doped silica and the cladding region 14 F-doped silica, or in a configuration in which the second core region 13 is pure silica and the cladding region 14 F-doped silica. Another applicable configuration is such that the second core region 13 is Cl-doped silica and the cladding region 14 is pure silica or silica doped with a smaller amount of Cl than the second core region 13.

With the optical fiber grating element 10 constructed as described above, it becomes feasible also to cover the surface of the multi-mode optical fiber surrounding the portion of the long-period grating 15 with the coating layer of resin or the like. In the case of the optical fiber filter 1 illustrated in FIG. 3, the long-period grating 15 is formed in the first core region 12 by once removing the coating of the multi-mode optical fiber and exposing it to ultraviolet light. Then one end of the multi-mode optical fiber with the long-period grating 15 formed therein is fusion-spliced to one end of the single-mode optical fiber 20 and the other end of the multi-mode optical fiber is fusion-spliced to one end of the single-mode optical fiber 30. After that, these fusion-spliced portions to the single-mode optical fibers 20, 30, together with the multi-mode optical fiber, are covered with the coating layer 16. Since the members 10, 20, 30 are integrally covered in this way, the coating can protect each of the optical fiber grating element 10 and the single-mode optical fibers 20, 30 and facilitates handling of each of the optical fiber grating element 10 and the optical fiber filter 1.

Since in the optical fiber grating element 10 according to this first embodiment the fundamental LP01-mode light of the loss wavelength is not coupled to the cladding-mode light radiating into the cladding region 14 but is coupled to the higher LP0m-mode light confined in the propagation region specified by the first and second core regions 12, 13, variations are small in the loss wavelength and in the loss amount (cutoff amount) even if the multi-mode optical fiber is covered with the coating layer 16 and even if the refractive index of the coating layer 16 takes any value.

The wavelength band used for the optical fiber grating and the optical fiber filter is preferably 1.2 μm or more but 1.7 μm or less. The reason is that the signal light wavelength bands generally used in optical communications and the like are the 1.3 μm band, the 1.55 μm band, the 1.65 μm band, and soon. In the multi-mode optical fiber applicable to the optical fiber grating element according to the present invention, the normalized frequency V specified by the following equation is preferably 4 or more but 12 or less at the wavelength band in use:

$$V = 2\pi a(n1^2 - n3^2)^{1/2}/\lambda \qquad (3).$$

Namely, since electromagnetic field distribution of the fundamental LP01-mode light is an even function, the electromagnetic field distribution of the high-order mode light also needs to be an even function in order to be coupled therewith. From this viewpoint, the normalized frequency V needs to be 4 or more at the wavelength band in use.

The higher the order of the higher LP0m ($m \geq 2$) mode, the larger the rate of a penetrating component (evanescent component) of the light of that mode out of the core region or the second core region, and the longer the distance of penetration. For that reason, the long-period grating becomes susceptible to the external environment around the multi-mode optical fiber and the loss wavelength and loss amount (cutoff amount) each also become easier to vary. The higher LP0m-mode light to be coupled with the fundamental LP01-mode light is preferably light relatively as close to the fundamental LP01 mode as possible; e.g., LP02, LP03, LP04, and so on. On the other hand, if there can exist light of many higher LP0m modes, it becomes difficult to realize the desired characteristics, because such light beams are close to each other. From this aspect, the normalized frequency V is preferably 12 or less at the wavelength band in use regarding to easy design and fabrication of each of the optical fiber grating element 10 and the optical fiber filter 1 with desired loss wavelength and loss amount (cutoff amount).

In some cases the loss wavelength or the loss amount (cutoff amount) varies under influence of the external environment around the cladding region 14 because of too weak confinement of the higher LP0m-mode light, depending upon the refractive index of the second core region 13 of the multi-mode optical fiber with the long-period grating 15 formed therein. In such cases, it is infeasible to provide the coating layer 16 on the surface of the multi-mode optical fiber. Therefore, the second core region 13 needs to confine the higher LP0m-mode light fully. The level of this confinement is dependent upon the refractive indices of the respective first core region 12, third core region 13, and cladding region 14 and also dependent upon the order m of the higher LP0m mode.

For example, supposing the outside diameter of the cladding region 14 is 125 μm and the relative index difference of the cladding region 14 on the basis of the refractive index of the second core region 13 is approximately −0.1% (=(n3−n2)/n2), the higher LP0m-mode light can be confined fully when the spacing between the periphery of the second core region 13 and the periphery of the cladding region 14 is 3 μm or more. If the relative index difference of the cladding region 14 on the basis of the refractive index of the second core region 13 is approximately −0.04%, the higher LP0m-mode light can be confined fully when the spacing between the periphery of the second core region 13 and the periphery of the cladding region 14 is 10 μm or more. However, if the relative index difference of the cladding region 14 on the basis of the refractive index of the second core region 13 is about −0.04% or more, the level of confinement of the higher LP0m-mode light will be greatly affected by bending of the multi-mode optical fiber, which is not practical. (Second Embodiment)

Figure 6:
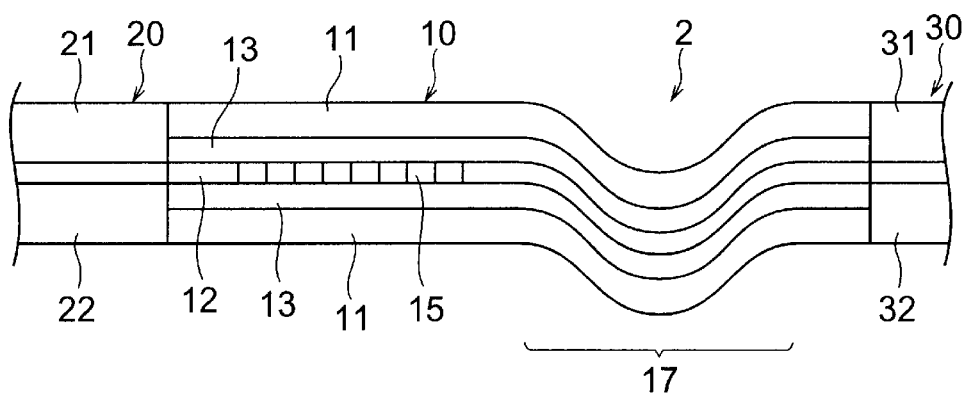
FIG. 6 is a cross-sectional view to show the structure of the second embodiment of the optical fiber grating and optical fiber filter according to the present invention.

Next, the second embodiment of the optical fiber grating element and the optical fiber filter according to the present invention will be described. FIG. 6 is a drawing to show the cross-sectional structure of the optical fiber grating element and the optical fiber filter according to the second embodiment. The optical fiber filter 2 of the second embodiment is similar to the structure of the optical fiber filter 1 according to the first embodiment, but is different therefrom in that the multi-mode optical fiber with the long-period grating 15 formed therein has a bent portion 17.

This bent portion 17 is provided between the fusion-spliced portion between the multi-mode optical fiber and the single-mode optical fiber 30 and the region of the grating 15 formed in the multi-mode optical fiber.

In the optical fiber filter 2 according to the present embodiment, among the light having propagated through the core region 22 of the single-mode optical fiber 20, the fundamental LP01-mode light of the wavelength (loss wavelength) satisfying the phase matching condition with the higher LP0m (m≧2)-mode light, is coupled to the higher LP0m-mode light by the long-period grating 15. The higher LP0m-mode light of the wavelength satisfying this phase matching condition, i.e., the loss wavelength radiates into the cladding region 14 in the bent portion 17 to attenuate. Since the mode field diameter of the multi-mode optical fiber is large for the higher LP0m-mode light of the loss wavelength, the loss is large upon incidence of the higher LP0m-mode light of the loss wavelength into the core region 32 of the single-mode optical fiber 30. On the other hand, the fundamental LP01-mode light of the wavelengths other than the loss wavelength undergoes little radiation in the bent portion 17 and little loss upon incidence into the core region 32 of the single-mode optical fiber 30. Accordingly, this optical fiber filter 2 cuts off the fundamental LP01-mode light of the loss wavelength among the light having propagated through the core region 22 of the single-mode optical fiber 20 more effectively than in the case of the above first embodiment (the loss amount is larger than in the case of the first embodiment), while guiding the fundamental LP01-mode light of the wavelengths other than the loss wavelength to the core region 32 of the single-mode optical fiber 30 with low loss.

Production Method

For fabrication of the optical fiber grating element with the long-period grating formed in the multi-mode optical fiber, it was common practice heretofore to once strip the coating layer off to expose part of the multi-mode optical fiber and expose the thus exposed portion to spatially modulated ultraviolet light, thereby forming periodic change of refractive index within the core region doped with GeO$_2$.

Since the surface of the multi-mode optical fiber with the long-period grating formed therein was not allowed to be covered with the coating layer as described above, the exposed surface of the multi-mode optical fiber easily underwent external damage such as scratches or the like and it was very difficult to handle it. In order to solve this problem, the optical fiber grating element and the optical fiber filter according to the present invention have the structure for enabling protection for the surface of the multi-mode optical fiber with the long-period grating formed therein, by the coating layer. However, even if they have the structure for enabling the protection by the coating layer as described, there is the possibility of the external damage during the stripping of the coating layer when the coating layer is once stripped off in the fabrication of the grating. Thus this stripping step must be carried out with care so as not to damage the surface of the multi-mode optical fiber.

An object of the production method of the optical fiber grating element according to the present invention is thus to provide a production method for forming the long-period grating in the multi-mode optical fiber without the above-stated stripping step, which takes considerable time and which involves the possibility of damaging the surface of the multi-mode optical fiber as described above.

Figure 7:
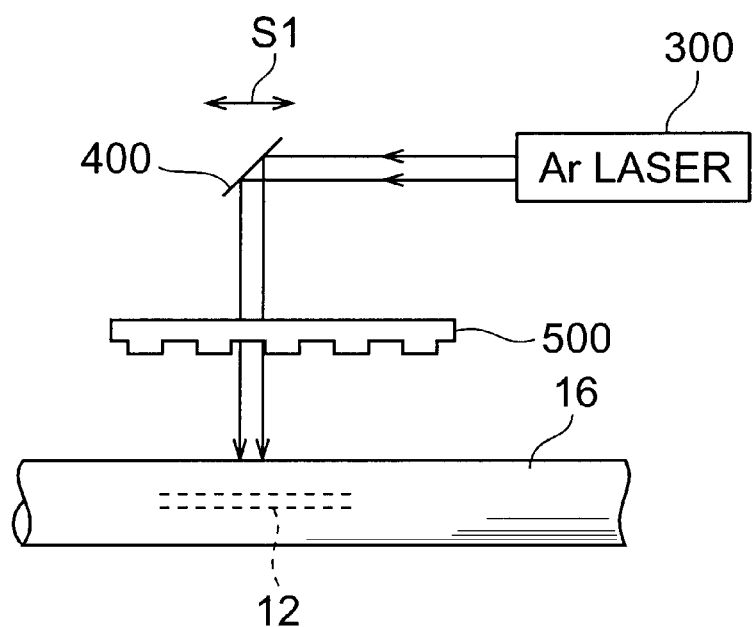
FIG. 7 is a conceptual diagram for explaining a production method of the optical fiber grating element according to the present invention.

Specifically, as illustrated in FIG. 7, prepared is an optical fiber material in which the surface of the multi-mode optical fiber having the index profile 150 or 250 as illustrated in FIG. 4B or FIG. 5 is covered with an ultraviolet-transmissive resin 16. Ultraviolet-transmissive resins suitable for the coating layer 16 are, for example, thermosetting silicone resin, vinyl ester, and soon. Further, it is also possible to apply either of general purpose type resins as long as they have the ultraviolet transmittance of over 50%. In order to facilitate the formation of the grating by enhancing the reactivity of glass defect included in the core region, it is preferable to preliminarily store the material in a hydrogen atmosphere under a predetermined pressure for a fixed period.

After that, an intensity modulation mask 500 is placed near the grating-forming region of the optical fiber material thus prepared. Then the ultraviolet light from an Ar laser 300 is guided via a mirror 400 onto the intensity modulation mask 500. On this occasion, the mirror 400 moves in the directions indicated by arrows S1 in the figure, whereby the ultraviolet-illuminating region in the set optical fiber material moves relatively.

The light spatially modulated through the intensity modulation mask 500 travels through the coating layer 16, the cladding region 14, and the second core region 13 in the stated order and thereafter reaches the first core region 12 doped with GeO$_2$. This forms periodic change of refractive index within the first core region 12 to obtain the desired long-period grating.

Figure 8:
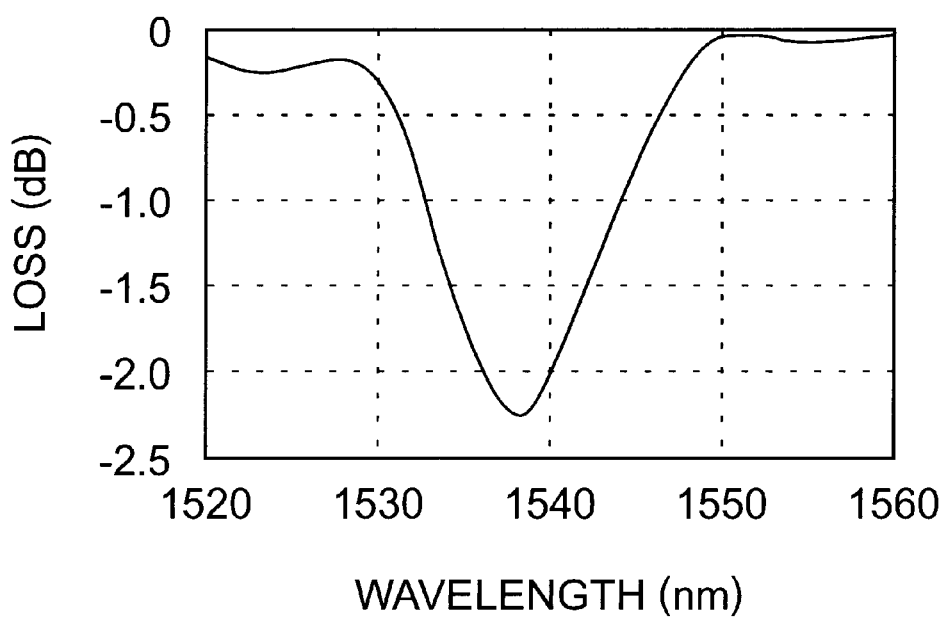
FIG. 8 is a graph to show the measurement result of cutoff characteristics of the optical fiber grating obtained by the production method illustrated in FIG. 7.

FIG. 8 is a graph to show the result of measurement of the cutoff characteristics of the optical fiber grating element fabricated by the production method as described above.

The optical fiber material prepared for the measurement was the multi-mode optical fiber having the structure illustrated in FIG. 4A and the surface of the multi-mode optical fiber was covered with the thermosetting silicone resin during fiber drawing.

After the multi-mode optical fiber (optical fiber material) covered with the thermosetting silicone resin as described was stored in the hydrogen atmosphere under 5 atm for the fixed period, the exposure to ultraviolet light (utilizing SHG) was conducted using the Ar laser 300, as illustrated in FIG. 7. The grating period of the long-period grating formed was 370 μm and this exposure to ultraviolet light was carried out through the thermosetting silicone resin coating made before fiber drawing.

It was verified that the long-period grating exhibiting the loss of about 2.2 dB near the wavelength 1540 nm was produced by the production method specifically described above (see the graph of FIG. 8).

Further, the inventors also measured tensile characteristics of the optical fiber grating element obtained. From the measurement, the rupture strength (n=10) was 6.1 kg on average and the standard deviation was 0.2 kg. For comparison, the rupture strength (n=10) was measured with the optical fiber grating element fabricated by the conventional production method (which was formed by making the long-period grating after removing the coating layer and thereafter by again covering the element with resin). The average rupture strength was 1.5 kg and the standard deviation was 0.8 kg. It was also verified from this result that the optical fiber grating element fabricated by the production method according to the present invention demonstrated the rupture strength higher than the optical fiber grating fabricated by the conventional production method.

Measurement Results of First Embodiment

Next, a plurality of specific samples actually produced will be described as to the optical fiber grating element and the optical fiber filter according to the first embodiment.

First, the multi-mode optical fibers of samples 1, 2 prepared are silica-based optical fibers each having the index profile of the DSC structure. The first core region 12 is silica co-doped with the Ge element and the B element and has the outside diameter of 2.78 μm. The relative index difference of the first core region 12 on the basis of the refractive index of the second core region 13 is +1.3% (=(n1−n2)/n2). The second core region 13 is pure silica dehydrated with $Cl_2$ (silica without intentional doping of impurity) and has the outside diameter of 28 μm. The cladding region 14 is silica doped with the F element and has the outside diameter of 125 μm. The relative index difference of the cladding region on the basis of the refractive index of the second core region 13 is −0.35% (=(n3−n2)/n2). In both of these samples 1, 2, there exist seven high-order modes (LP02, LP11, LP21, LP31, LP12, LP03, LP41) in addition to the fundamental LP01 mode in the 1.55 μm wavelength band.

The multi-mode optical fibers of samples 1, 2 were subjected to a pretreatment in a 100% hydrogen atmosphere at 50° C. and under 5 atm for three days and thereafter the long-period grating 15 was formed therein. In the formation of the long-period grating 15, the ultraviolet light emitted from an Ar laser source was guided through the intensity modulation mask directly into each multi-mode optical fiber of sample 1 or 2, thereby forming the index perturbations. The length of the region of the long-period grating 15 formed is 30 mm. In sample 1 the period of the refractive index change (the grating period) in the long-period grating 15 is 405 μm and in sample 2 it is 380 μm. After the formation of the long-period grating 15, each of the samples 1, 2 was annealed at 140° C. for ten hours to remove hydrogen and recoated with the coating layer 16.

Figure 9A:
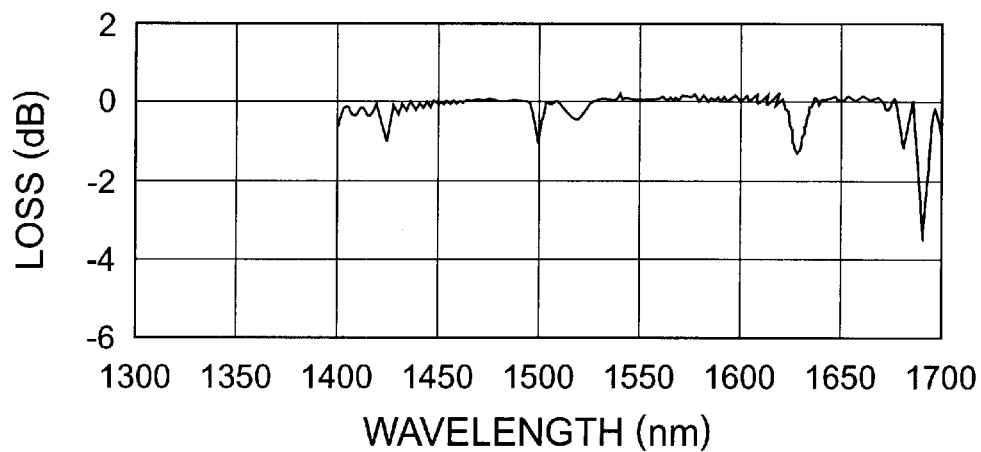
FIGS. 9A, 9B and 9C are graphs to show the cutoff characteristics of the optical fiber filter according to the first embodiment wherein the period (grating period) of index perturbations in the long-period grating is 405 μm.
Figure 9B:
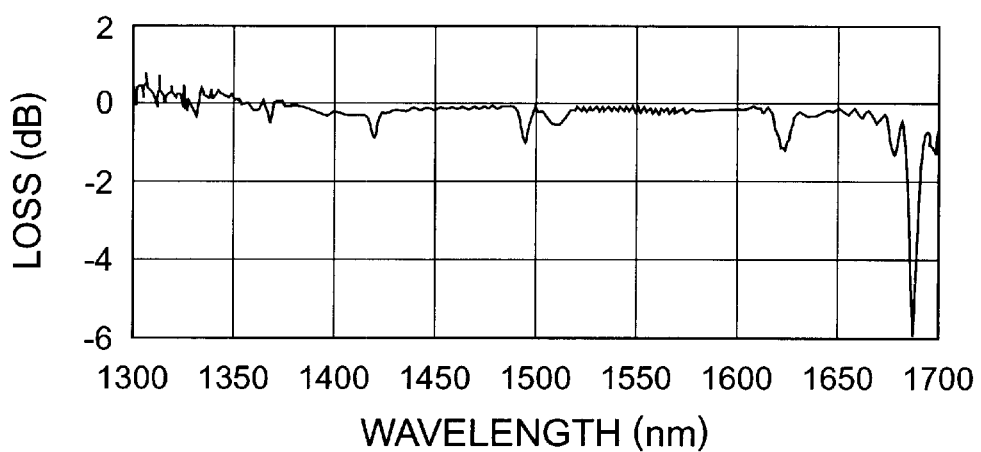
Figure 9C:
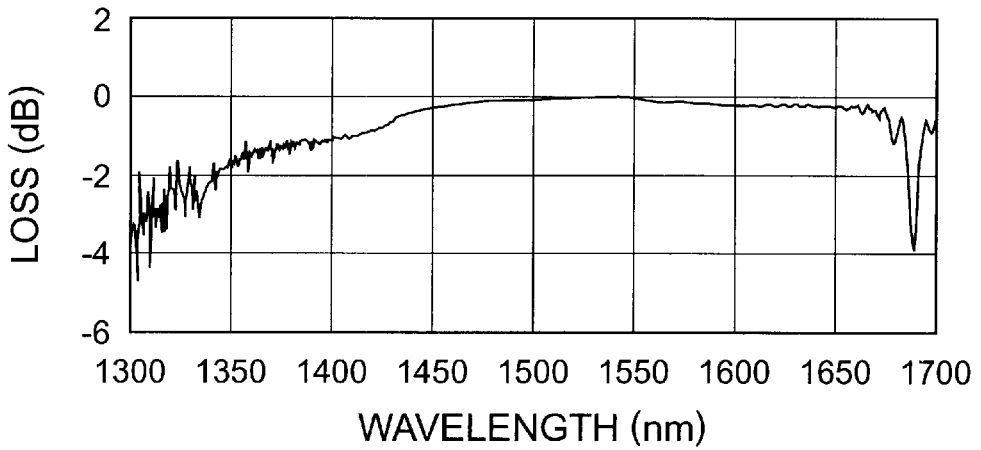
Figure 10A:
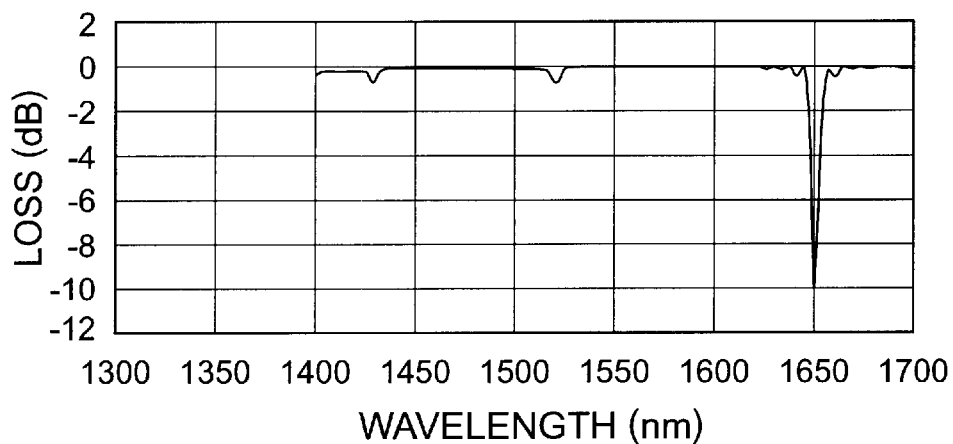
FIGS. 10A, 10B and 10C are graphs to show the cutoff characteristics of the optical fiber filter according to the first embodiment wherein the period (grating period) of index perturbations in the long-period grating is 380 μm.
Figure 10B:
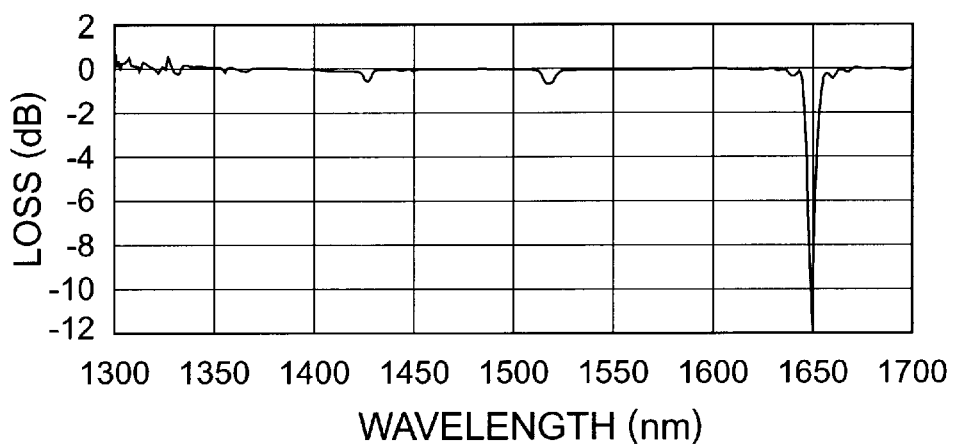
Figure 10C:
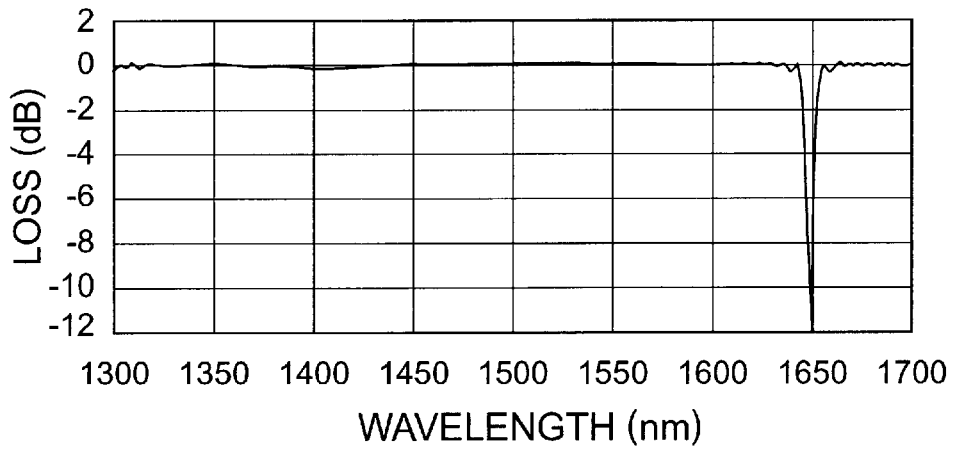

FIGS. 9A to 9C are graphs to show the cutoff characteristics of sample 1 in which the grating period of the long-period grating is 405 μm; FIG. 9A shows the cutoff characteristics upon the fabrication, FIG. 9B those after the annealing, and FIG. 9C those after the recoating. FIG. 10A to FIG. 10C are graphs to show the cutoff characteristics of sample 2 in which the grating period in the long-period grating is 380 μm; FIG. 10A shows the cutoff characteristics upon the fabrication, FIG. 10B those after the annealing, and FIG. 10C those after the recoating.

Each of these graphs shows ratios of power of light having traveled from the sample 1 or 2 into the single-mode optical fiber 30 and out of the other end of the single-mode optical fiber 30, to power of light injected from the single-mode optical fiber 20 into each sample 1 or 2.

As seen from these figures, the loss peak wavelength of sample 1 (the grating period of the long-period grating is 405 μm) was near 1690 nm, and the loss peak wavelength of sample 2 (the grating period in the long-period grating is 380 μm) was near 1650 nm. The transmission loss at the loss peak wavelength of these samples 1, 2 is caused by the coupling from the fundamental mode LP01 to the LP02 mode. With each of the samples 1, 2 there was no extinction of the loss wavelength even after the recoating (there occurred no change in the loss peak wavelength and only slight variation of transmission loss).

Measurement Results of Second Embodiment

Next, a specific sample actually fabricated will be described as to the optical fiber grating element and the optical fiber filter according to the second embodiment.

First, the multi-mode optical fiber of sample 3 prepared is a silica-based optical fiber having the index profile of the DSC structure. The first core region 12 is silica co-doped with the Ge element and the B element and has the outside diameter of 3.4 μm. The relative index difference of the first core region on the basis of the refractive index of the second core region 13 is +0.995%. The second core region 13 is pure silica dehydrated with $Cl_2$ and has the outside diameter of 100 μm. The cladding region 14 is silica doped with the F element and has the outside diameter of 125 μm. The relative index difference of the cladding region 14 on the basis of the refractive index of the second core region 13 is −0.749%. With this multi-mode optical fiber of sample 3, there also exist some high-order modes in addition to the fundamental LP01 mode in the 1.55 μm wavelength band.

With this multi-mode optical fiber of sample 3, the long-period grating 15 is formed without the pretreatment. On the occasion of the formation of the long-period grating 15, the ultraviolet light emitted from an excimer laser source was guided through the intensity modulation mask into the multi-mode optical fiber of sample 3, thereby forming the index perturbations. The length of the region of the long-period grating 15 formed is 40 mm and the grating period in the long-period grating 15 is 403 μm. After the formation of the grating 15, the sample 3 was annealed at 140° C. for ten hours to remove hydrogen and then was recoated with the coating layer 16. This coating layer 16 has the refractive index approximately equal to that of the cladding layer 14 of the outermost layer.

Figures 11, 12:
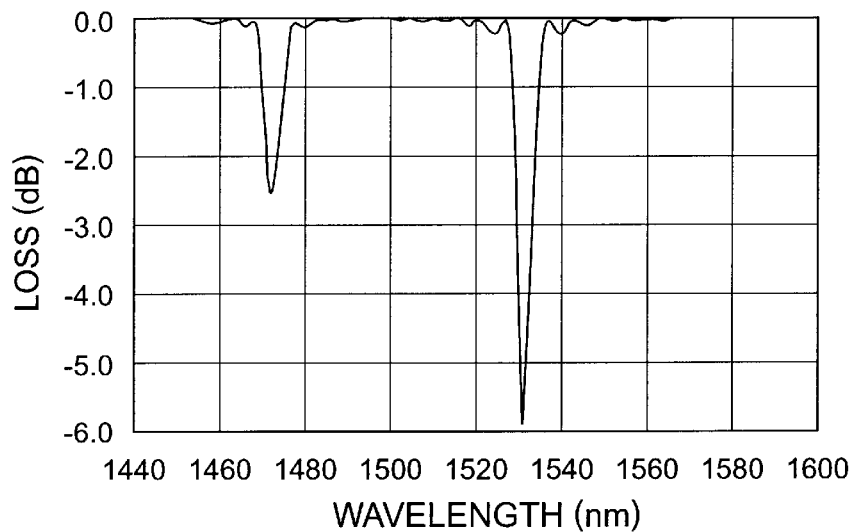
FIG. 11 is a graph to show the cutoff characteristics of the second embodiment of the optical fiber grating and optical fiber filter according to the present invention.
FIG. 12 is a table to show compositions and temperature characteristics of respective samples fabricated for evaluating controllability of loss peak wavelength in the optical fiber grating elements according to the present invention.

FIG. 11 is a graph to show the cutoff characteristics of sample 3 after the recoating. As seen from this figure, the loss peak wavelength in sample 3 was near 1530 nm. The transmission loss at this loss peak wavelength is caused by the coupling from the fundamental mode LP01 to the LP02 mode. This sample 3 demonstrates no extinction of the loss wavelength though it is recoated with the coating layer 16 having the refractive index approximately equal to that of the cladding region 14 of the outermost layer (the maximum loss is about 6.0 dB).

Temperature Dependence

Next, it is known that the loss peak wavelength of the long-period grating varies with change of temperature, and the temperature dependence of the loss peak wavelength in the long-period grating formed in the optical fibers for general purpose is approximately 4–10 nm/100° C. (=0.04 to 0.1 nm/° C.). For example, U.S. Pat. No. 5,703,978 and Japanese Patent Application No. H09-274115 disclose the technologies for reducing such temperature dependence of the long-period grating.

However, since the technologies disclosed in above U.S. Pat. No. 5,703,978 and Japanese Patent Application No. H09-274115 require extremely fine density control, improvement is not expected in productivity.

The temperature dependence of the loss peak wavelength in the long-period grating is determined by the difference between temperature coefficients of the respective effective refractive indices of the core-mode light exhibiting dominant temperature dependence of the refractive index in the core region and of the cladding-mode light exhibiting dominant temperature dependence of the refractive index in the cladding region. It is thus necessary to precisely match the temperature coefficients of the effective refractive indices of the core and cladding with each other in order to effectively reduce the temperature dependence of the loss peak wavelength of the long-period grating. On the contrary, the temperature dependence described above is not sufficient as to the temperature active control positively making use of the temperature dependence of the loss peak wavelength in the long-period grating. The reason is as follows: since the loss characteristics (cutoff characteristics) of the long-period grating have some width centered about the loss peak wavelength, as illustrated in FIG. 8, it is desirable to achieve the temperature dependence greater than aforementioned 0.1 nm/° C. for positively shifting the loss peak wavelength. Also taking the connection to an ordinary single-mode optical fiber into consideration, it is preferable that the propagation of the light in the optical fiber with the long-period grating formed therein be the single mode. In that case, the doping amount of $GeO_2$ in the core is limited, and thus the available temperature dependence is limited to about 0.04 to 0.1 nm/° C. as described above.

In the optical fiber grating element according to the present invention, since the core fraction included in the cladding-mode light is relatively large, the temperature dependence of the effective refractive index is controlled to a low level even if there is some difference in the actual temperature dependence (dn/dt) of refractive index between the core and cladding. The optical fiber grating enables further reduction of the temperature dependence of the long-period grating, or the temperature active control of the long-period grating by applying the multi-mode optical fiber having the index profile 150 or 250 as illustrated in FIG. 4B or FIG. 5 and controlling the kind and concentration of impurity added to the first core region for the long-period grating to be formed therein.

Specifically, the present invention is directed to attainment of desired temperature dependence characteristics by adding a predetermined amount of at least either element of Ge, P and B into the first core region and forming the long-period grating in this first core region.

Figure 1A:
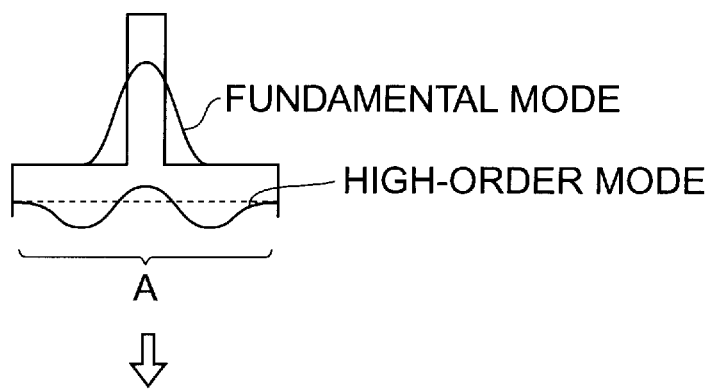
FIG. 1A is a conceptual drawing for explaining types of propagation in the single-mode optical fiber, and FIG. 1B a conceptual diagram for explaining the problem arising when the peripheral surface of the single-mode optical fiber illustrated in FIG. 1A is covered with a resin layer.
Figure 1B:
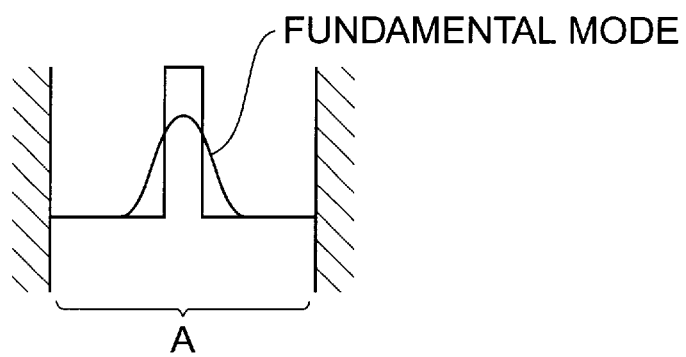

The inventors prepared an optical fiber (sample 4) having the index profile similar to FIG. 1A and optical fibers (samples 5 to 7) having the index profile similar to FIG. 4B, and measured the temperature dependences of the respective samples. FIG. 12 is a table to show the compositions and temperature dependences of respective samples 5 to 7 thus prepared.

First, sample 4 prepared is a silica-based optical fiber consisting of the core of the outside diameter of 2.5 μm and the pure silica cladding of the outside diameter of 125 μm. The core of this sample 4 is one co-doped with $GeO_2$ and $B_2O_3$ and the molar ratio of these is 3.5:1. The grating period (pitch) of the long-period grating formed in the core is 410 nm and the loss peak wavelength (the center wavelength of loss) is 1528 nm. The temperature dependence of the long-period grating in this sample 4 was +0.021 nm/° C. (see FIG. 12).

Sample 5 is a silica-based optical fiber consisting of the first core region of the outside diameter of 2.8 μm, the second core region of the outside diameter of 28 μm, and the cladding region of the outside diameter of 125 μm. The first core region of this sample 5 is one co-doped with $GeO_2$ and $B_2O_3$ and the molar ratio of these is 3.5:1. The second core region is pure silica and the cladding region is doped with fluorine. The grating period (pitch) of the long-period grating formed in the first core region is 370 nm and the loss peak wavelength (the center wavelength of loss) is 1540 nm. The temperature dependence of the long-period grating in this sample 5 was +0.010 nm/° C. (see FIG. 12).

Sample 6 is also a silica-based optical fiber consisting of the first core region of the outside diameter of 2.8 μm, the second core region of the outside diameter of 28 μm, and the cladding region of the outside diameter of 125 μm. The molar ratio of $GeO_2$ and $B_2O_3$ in the first core region co-doped therewith in this sample 5 is 3:1. The second core region is pure silica and the cladding region is doped with fluorine. The grating period (pitch) of the long-period grating formed in the first core region is 370 nm and the loss peak wavelength (the center wavelength of loss) is 1537 nm. The temperature dependence of the long-period grating in this sample 6 was +0.002 nm/° C. (see FIG. 12).

Sample 7 is also a silica-based optical fiber consisting of the first core region of the outside diameter of 2.8 μm, the second core region of the outside diameter of 28 μm, and the cladding region of the outside diameter of 125 μm, similar to above samples 5, 6. The molar ratio of $GeO_2$ and $B_2O_3$ in the first core region co-doped therewith in this sample 7 is 1:2. The second core region is pure silica and the cladding region is doped with fluorine. The grating period (pitch) of the long-period grating formed in the first core region is 370 nm and the loss peak wavelength (the center wavelength of loss) is 1541 nm. The temperature dependence of the long-period grating in this sample 7 was −0.132 nm/° C. (see FIG. 12).

From comparison between sample 4 and sample 5, it is seen that even if the core is doped with the same impurities in the identical composition, the optical fiber of the structure realizing the index profile 150 or 250 like the optical fiber grating element according to the present invention can reduce the temperature dependence of the long-period grating more. In addition, the temperature dependence of the long-period grating can be reduced further by increasing the molar ratio of added $B_2O_3$ to $GeO_2$, as in sample 6.

Accordingly, in order to reduce the temperature dependence of the long-period grating more than before, the optical fiber grating element according to the present invention is preferably designed so that there exists at least one m satisfying the following relation:

$$\frac{0.01\,(\mu m/^\circ C.)}{\Lambda(\mu m)} \geq \left| \frac{d}{dT}(Neff01) - \frac{d}{dT}(Neff0m) \right|,$$

where dNeff01/dT is the temperature dependence of the effective refractive index Neff01 with respect to the fundamental LP01-mode light, dNeff0m/dT (m≧2) the temperature dependence of the effective refractive index Neff0m with respect to the LP0m (m≧2)-mode light, and Λ the grating period of the above long-period grating.

To the contrary, sample 7 has the molar ratio of $B_2O_3$ to $GeO_2$ much greater than the other samples 5, 6. By such over doping of the B element, dλ/dT can be made large in the negative (or the temperature dependence of the long-period grating can be made extremely large), so as to obtain the optical fiber grating element suitable for the temperature active control of the loss peak wavelength in the long-period grating. For positively making use of the temperature dependence of the loss peak wavelength as described, the optical fiber grating element according to the present invention is preferably designed so that there exists at least one m satisfying the following relation:

$$\frac{0.08\,(\mu m/^\circ C.)}{\Lambda(\mu m)} \geq \left|\frac{d}{dT}(Neff01) - \frac{d}{dT}(Neff0m)\right|,$$

where dNeff01/dT is the temperature dependence of the effective refractive index Neff01 with respect to the fundamental LP01-mode light, dNeff0m/dT (m≧2) the temperature dependence of the effective refractive index Neff0m with respect to the LP0m (m≧2)-mode light, and Λ the grating period of the above grating.

In this embodiment, the first core region is also doped with $B_2O_3$, together with $GeO_2$, but the same effect can also be achieved by doping the region with P or with a compound containing P.

As described above, according to the present invention, the multi-mode optical fiber provided with the long-period grating has the structure in which the region with the low refractive index is further provided on the periphery of the region in which the higher LP0m-mode light propagates, whereby the optical fiber grating element and the like can be obtained with excellent coupling characteristics and cutoff characteristics even if the multi-mode optical fiber is coated with the resin layer or the like.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber grating element, comprising:
   a multi-mode optical fiber having a cutoff wavelength regarding LP02-mode light on the longer wavelength side than a wavelength band in use, said multi-mode optical fiber having a first core region of a refractive index n1 extending along a predetermined axis, a second core region provided on a periphery of said first core region and having a refractive index n2 lower than that of said first core region, and a cladding region provided on a periphery of said second core region and having a refractive index n3 lower than that of said second core region; and
   a grating provided in a predetermined region of said first core region and selectively coupling fundamental LP01-mode light of a predetermined wavelength within the wavelength band in use to LP0m (m≧2)-mode light,
   wherein said optical fiber grating element satisfies the following relation:

n1>Neff01>n2>Neff0m>n3 where Neff01 is an effective refractive index with respect to the fundamental LP01-mode light and Neff0m an effective refractive index with respect to the LP0m (m≧2)-mode light.

2. An optical fiber grating element according to claim 1, wherein only said first core region of said multi-mode optical fiber is doped with $GeO_2$.

3. An optical fiber grating element according to claim 1, wherein, in said multi-mode optical fiber, at least a predetermined portion of said first core region in which said grating is formed is covered with resin.

4. A method of producing an optical fiber grating element according to claim 3, said method comprising:
   preparing a multi-mode optical fiber having a cutoff wavelength regarding to LP02-mode light on the longer wavelength side than a wavelength band in use, said multi-mode optical fiber having a first core region extending along a predetermined axis and doped with a predetermined amount of $GeO_2$, a second core region provided on a periphery of said first core region and having a refractive index lower than that of said first core region, and a cladding region provided on a periphery of said second core region and having a refractive index lower than that of said second core region;
   covering a peripheral surface of said multi-mode optical fiber with an ultraviolet-transmissive resin; and
   exposing said ultraviolet-transmissive resin covering said multi-mode optical fiber with ultraviolet light to form periodic change of refractive index within said first core region along said predetermined axis.

5. An optical fiber grating element according to claim 1, wherein the wavelength band in use is within the range of 1.2 $\mu$m or more but 1.7 $\mu$m or less.

6. An optical fiber grating element according to claim 1, wherein said multi-mode optical fiber has normalized frequency of 4 or more but 12 or less at the wavelength band in use.

7. An optical fiber grating element according to claim 1, where in there exists at least on em satisfying the following relation:

$$\frac{0.01}{\Lambda} \geq \left|\frac{d}{dT}(Neff01) - \frac{d}{dT}(Neff0m)\right|,$$

where dNeff01/dT is a temperature dependence of the effective refractive index Neff01 with respect to the fundamental LP01-mode light, dNeff0m/dT (m≧2) a temperature dependence of the effective refractive index Neff0m with respect to the LP0m (m≧2)-mode light, and Λ a grating period of said grating.

8. An optical fiber grating element according to claim 7, wherein said first core region contains at least one of Ge element, P element and B element.

9. An optical fiber grating element according to claim 1, wherein there exists at least one m satisfying the following relation:

$$\frac{0.08}{\Lambda} \leq \left|\frac{d}{dT}(Neff01) - \frac{d}{dT}(Neff0m)\right|,$$

where dNeff01/dT is a temperature dependence of the effective refractive index Neff01 with respect to the fundamental LP01-mode light, dNeff0m/dT (m≧2) a temperature dependence of the effective refractive index Neff0m with respect to the LP0m (m≧2)-mode light, and Λ a grating period of said grating.

10. An optical fiber grating element according to claim 8, wherein said first core region contains at least one of Ge element, P element and B element.

11. An optical fiber filter, comprising:
    an optical fiber grating element according to claim 1;
    a single-mode optical fiber having one end optically connected to at least one end of said optical fiber grating element and having a cutoff frequency regarding to LP02-mode light on the shorter wavelength side than a wavelength band in use.

* * * * *